United States Patent [19]

Bennett

[11] Patent Number: 5,419,064
[45] Date of Patent: May 30, 1995

[54] INSERTION INTERLOCK CONNECTOR FOR IMPROVED PICTURE FRAME

[76] Inventor: Terrence M. Bennett, 0 N. 208 Cumnor Ave., Glen Ellyn, Ill. 60137

[21] Appl. No.: 77,204

[22] Filed: Jun. 16, 1993

[51] Int. Cl.⁶ .............................. G09F 1/12
[52] U.S. Cl. ...................... 40/155; 403/401; 403/406.1; 403/326
[58] Field of Search .......... 40/155, 152, 156; 403/401, 402, 406.1, 382, 326

[56] References Cited

U.S. PATENT DOCUMENTS

| | | | |
|---|---|---|---|
| 2,136,906 | 11/1938 | McAdams | 40/155 |
| 4,055,910 | 11/1977 | Schmidt | 403/401 |
| 4,368,584 | 1/1983 | Logan | 403/401 |
| 4,380,110 | 4/1983 | Harig | 403/401 |
| 4,833,803 | 5/1989 | Schwartz | 40/155 |

FOREIGN PATENT DOCUMENTS 3141378  5/1983  Germany ................. 40/155

Primary Examiner—Kenneth J. Dorner
Assistant Examiner—Cassandra Davis
Attorney, Agent, or Firm—Davis Chin

[57] ABSTRACT

A picture frame is constructed of four similar frame members attached at their ends by four similar connecting devices so as to delineate a planar rectangular configuration. Each frame member is secured to each connecting device by an insertion interlock section having an integral insertion interlock tab which enters an insertion interlock recess formed in the frame member and located along its length thereof. Each of the connecting devices is formed of two insertion interlock sections which diverge 90° apart from each other from a vertex. Further, each of the insert interlock sections includes a transverse interlock insert, a resilient deflection beam, and an insertion interlock tab all integrally connected together.

4 Claims, 4 Drawing Sheets

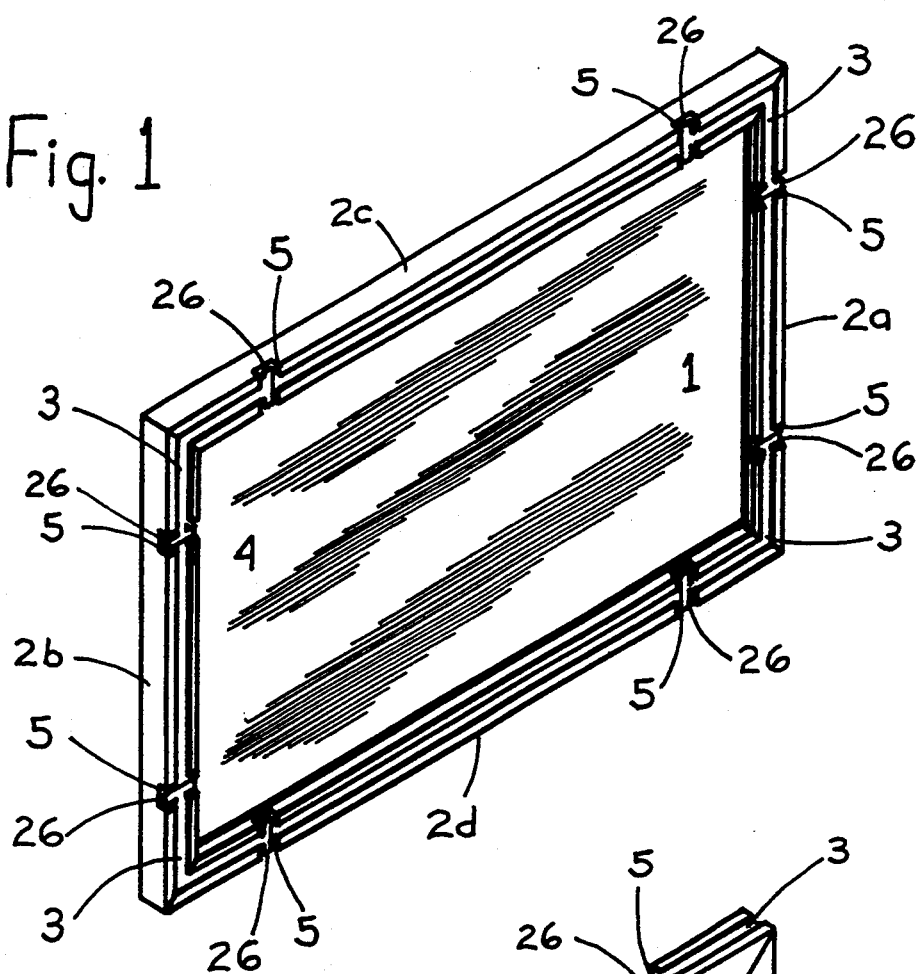
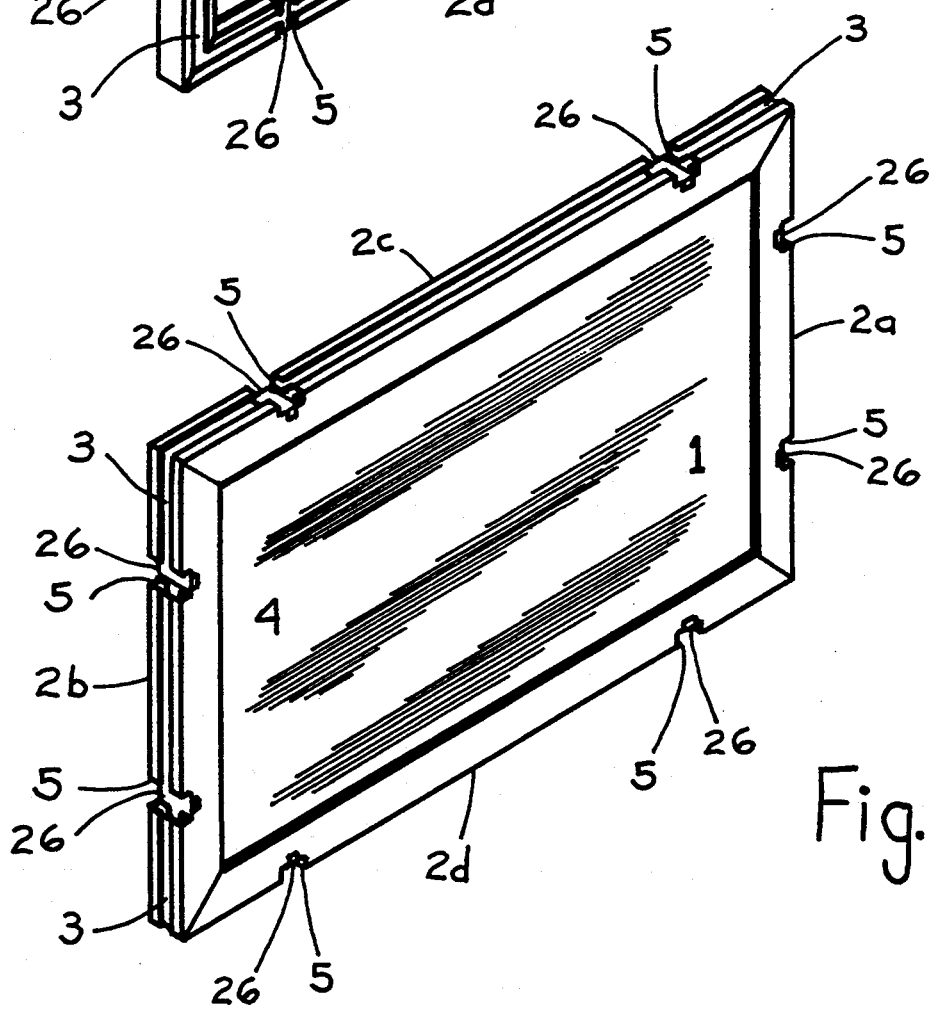

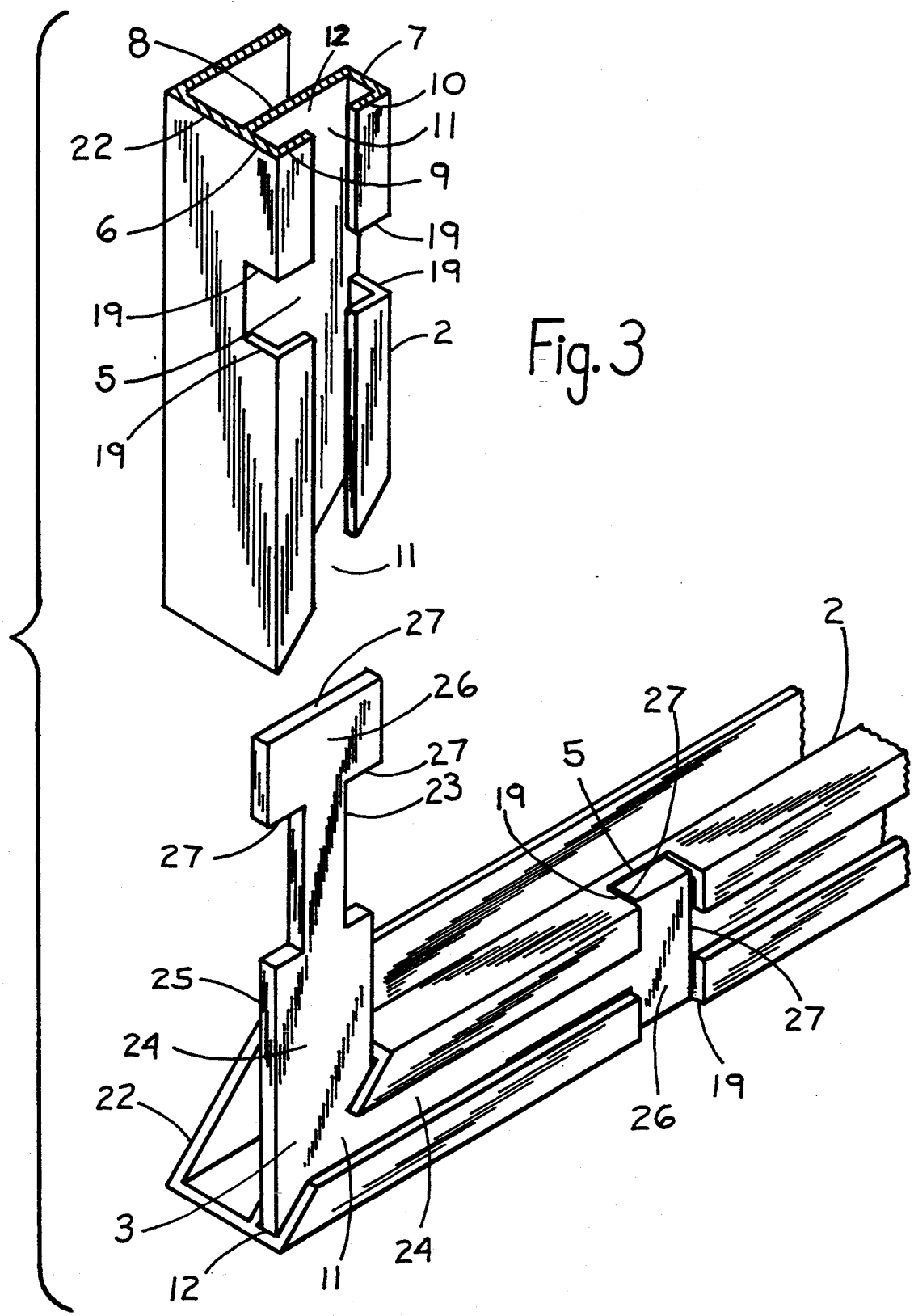

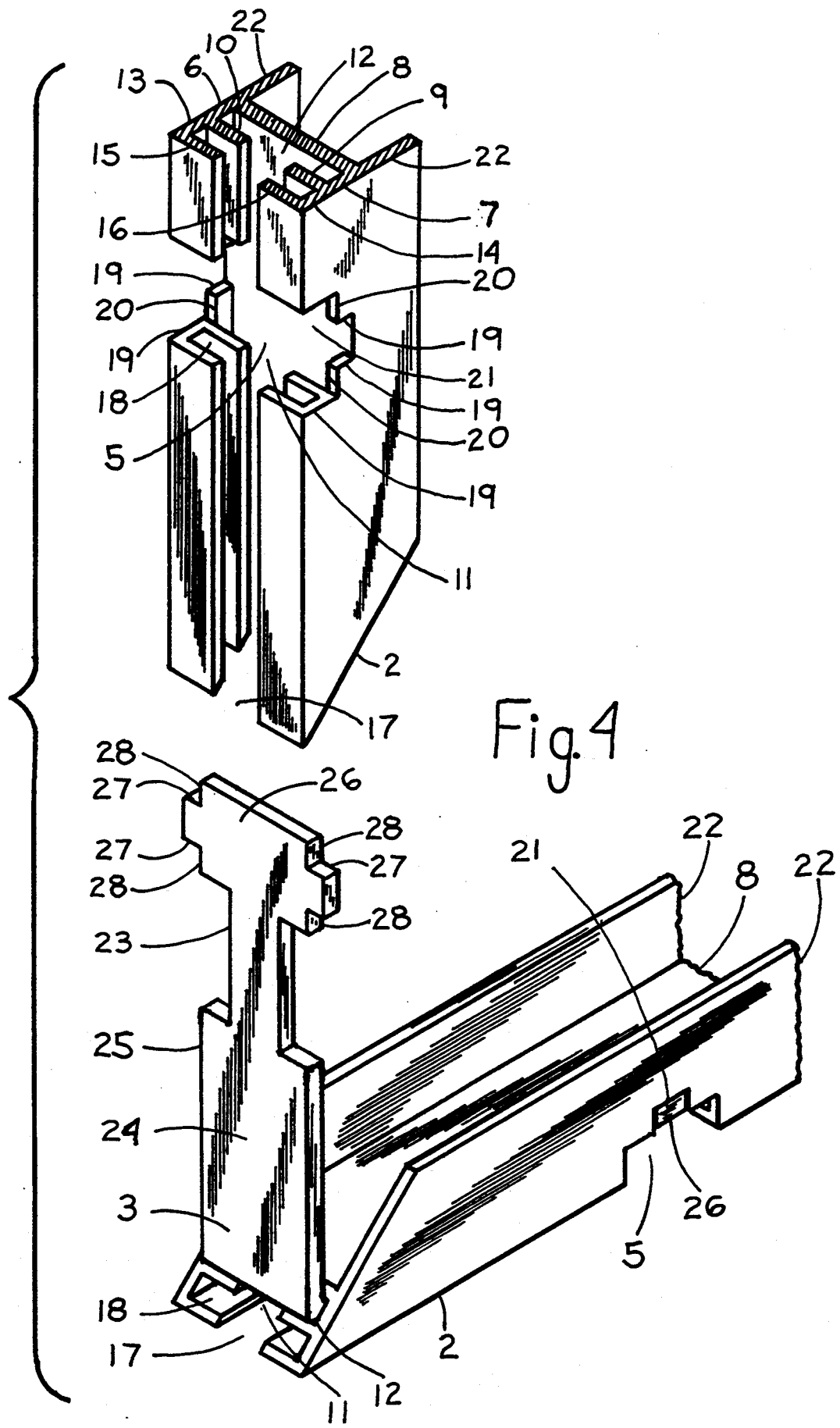

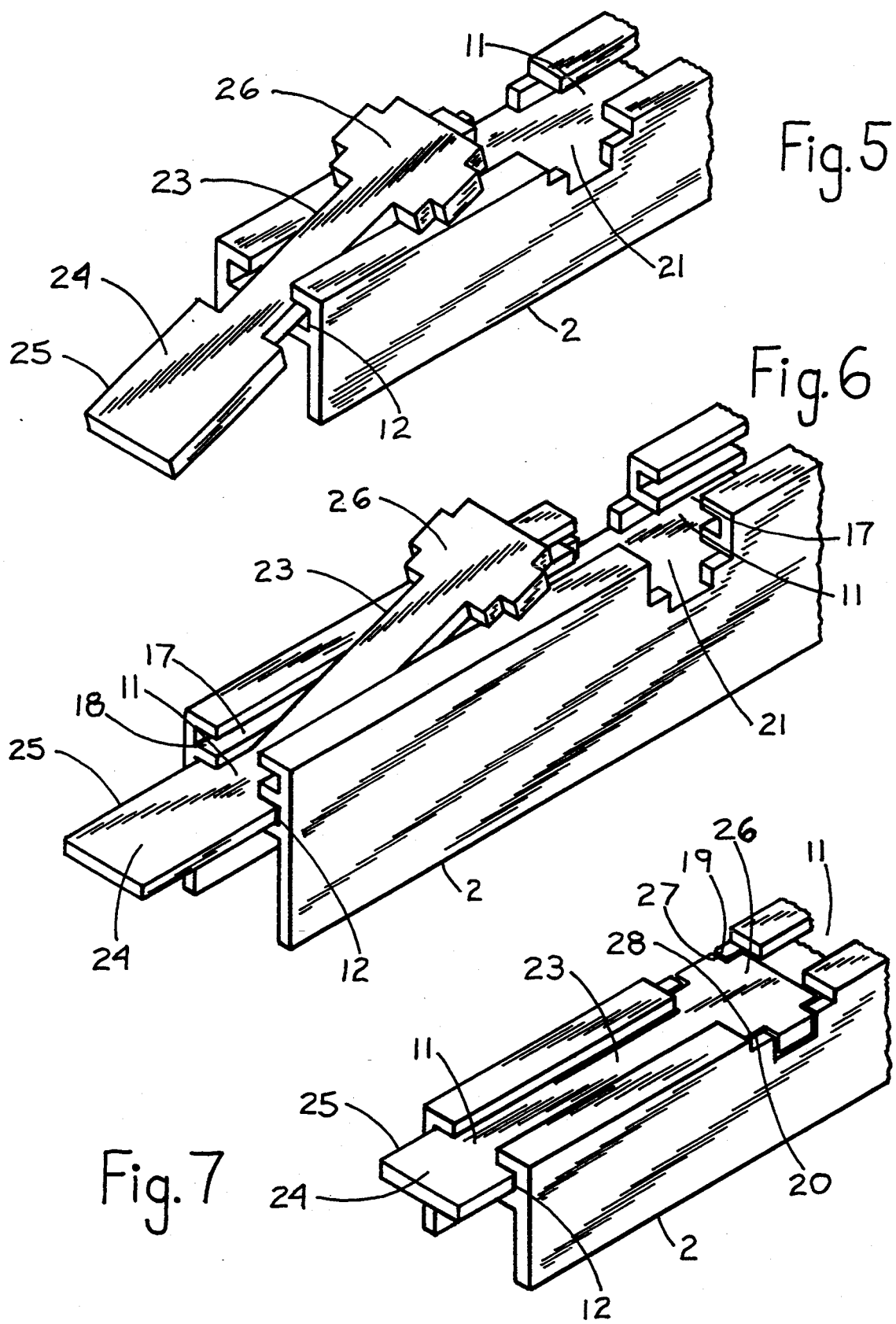

INSERTION INTERLOCK CONNECTOR FOR IMPROVED PICTURE FRAME

BACKGROUND OF THE INVENTION

The picture frame, a common household device used to display, support, and protect, the exhibited picture by its edges, typically delineates a planar rectangle. Prior art includes frame members interconnected by nails, staples, ninety degree corners with interference fits, permanent material distortion, set screws, internal interlocking deflection stud and hole. These prior means of connecting frame members often required tools for assembly, or sophisticated tooling for part fabrication.

SUMMARY OF THE INVENTION

It is the principal object of the present invention to provide an improved and simplified exhibit framing device requiring less sophisticated part design and fabrication.

It is another object of the present invention to provide a connector which locks to the frame member, when the oversized tab portion of the connector interlocks with a recess located along the frame members length and enters the recess from outside the frame members traverse crossection.

It is another object of the present invention to provide a stepped interlock tab and recess for a stiffer connection.

It is another object of the present invention to provide a reusable means of connection which is not damaged during the coupling process.

It is another object of the present invention to provide a versatile framing system with a minimum number of interchangable parts.

It is another object of the present invention to provide a coupling means where tools are not required for assembly.

It is another object of the present invention to provide a connector device which can be produced in a flat plane or from a flat piece of material.

It is another object of the present invention to provide an improved and simplified exhibit framing device where individual framed exhibits can be connected together using similar coupling means.

It is another object of the present invention to provide means of connection where multiple stacked connections of similar configuration utilize a common deflection beam opening to minimize frame members crossectional area.

These and additional objects now set forth specifically herein, which will be readily apparent to those skilled in the art, from the detailed description provided below with appropriate reference to the accompanying drawings.

BRIEF DESCRIPTION OF THE DRAWINGS

FIG. 1 is front isometric view of picture frame for single sided exhibit embodying the present invention.

FIG. 2 is front isometric view of picture frame for double sided exhibit embodying a multi-stacked version of the present invention with stepped interlock tab and recess.

FIG. 3 is a fragmentary enlarged isometric view of frame and connector components in FIG. 1 attendant to their assembly.

FIG. 4 is a fragmentary enlarged isometric view of frame and connector components in FIG. 2 attendant to their assembly.

FIG. 5 is a fragmentary enlarged isometric view of insertion interlock section aligned with frame member for assembly.

FIG. 6 is a fragmentary enlarged isometric view of insertion interlock section during insertion with multiple traverse interlock channel frame member.

FIG. 7 is a fragmentary enlarged isometric view of insertion interlock section secured to frame member.

DETAILED DESCRIPTION OF THE PREFERRED EMBODIMENTS

Now referring in detail to the drawings which illustrate the present invention, FIG. 1 and FIG. 2 show assembled picture frames 1, in two styles that embody the present invention. Each picture frame 1, is constructed of four frame members 2, each of similar configuration, two side members 2a, 2b, top member 2c, bottom member 2d, connected by four identical insertion interlock connectors 3, delineating a planar rectangle of any dimensions, and entrapping the exhibited picture 4. Each style frame member 2, is of uniform traverse crossection, excluding insertion interlock recess 5, is integrally formed, and manufactured preferably by the extrusion of aluminum or polymeric composition.

In FIG. 3 and FIG. 4, each style frame member 2, with uniform traverse crossection, has two lateral retaining walls 6, 7, connected to the longitudinal main wall 8, and extending in a similar direction. Longitudinal retaining walls 9, 10, are connected to lateral retaining walls 6, 7, and extend towards lateral center, defining the deflection beam opening 11, between their terminating ends, and completing the definition of the traverse interlock channel 12. In FIG. 4, lateral walls 13, 14, are added and extend in a similar direction, along which longitudinal retaining walls 15, 16, start and extend towards lateral center, defining the common deflection beam opening 17, between their terminating ends, and defining a similar traverse interlock channel 18.

In FIG. 3 and FIG. 4, near each end of frame member 2, lateral walls 6, 7, and longitudinal retaining walls 9, 10, are removed to create insertion interlock surfaces 19, and define the insertion interlock recess 5. In FIG. 4 longitudinal retaining walls 9, 10, 15, 16, and lateral retaining walls 13, 14, are further removed along the frame members length, exposing lateral interlock surfaces 20, and defining the stepped insertion interlock recess 21. To retain the exhibit or display to the frame member 2, one or more exhibit retaining wall(s) 22, are connected to the longitudinal main wall 8, and entrap the exhibit when assembly of the four frame members 2, is completed.

Insertion interlock connector 3, is composed of a rigid resilient material whose deflection beam 23, will flex through insertion of frame member 2, without permanant distortion. Each insertion interlock connector 3, is composed of two insertion interlock sections 24, diverting 90 degrees apart from the vertex in this order, traverse interlock insert 25, deflection beam 23, insertion interlock tab 26, its three minimum functional areas. The insertion interlock surfaces 27, in FIG. 3 are stepped along the insertion interlock tabs 26, length in FIG. 4 to create lateral interlock surfaces 28, which mate with stepped insertion interlock recess 21.

For engagement of the insertion interlock section 24, with frame member 2, the crossectional dimensions and shape of the traverse interlock insert 25, should nearly match that of the frame members 2, traverse interlock channel 12, allowing minimal clearance so the traverse interlock insert 25, will slide inside traverse interlock channel 12. The deflection beam 23, must be able to fit through deflection beam opening 11, during engagement so as to lock the frame member 2, and the insertion interlock section 24, together. The length of the insertion interlock tab 26, must be less than the length of insertion interlock recess 5. The width of the insertion interlock tab 26, must be greater than the distance between lateral walls 6, 7. The stepped insertion interlock recess 21, requires the distance between lateral interlock surfaces 28, 29, to be less than the distance between lateral walls 6, 7.

To begin engagement of insertion interlock section 24, with frame member 2, refer to FIG. 5, align traverse interlock insert 25, with traverse interlock channel 12, and beyond the entry to the traverse interlock channel 12, with deflection beam 23, inside deflection beam opening 11, and insertion interlock tab 26, outside the traverse interlock channel 12. With the foregoing alignment guide traverse interlock insert 25, into frame members 2, traverse interlock channel 12, as in FIG. 6 causing the deflection beam 23, to deform. Continue insertion until, as in FIG. 7, insertion interlock tab 26, is aligned with frame members 2, stepped insertion interlock recess 21, and the resilient deflection beam 23, will couple insertion interlock tab 26, with stepped insertion interlock recess 21, locking the parts together.

While described and illustrated in the preferred embodiment of the present invention it is apparent the numerous alterations, additions, and ommissions may be made without departing from the spirit thereof.

I claim:

1. A picture frame comprising:
   four substantially elongated identical frame members (2);
   four identical L-shaped insertion interlock connectors (3);
   said frame members (2) having their adjacent ends thereof connected by said insertion interlock connectors (3) so as to delineate a planar rectangular configuration;
   each of said frame members (2) being of uniform transverse cross section along a substantial length thereof and including,
   a longitudinal main wall (8);
   first and second parallel lateral retaining walls (6, 7) extending perpendicularly from opposed side edges of said longitudinal main wall along the length thereof;
   a first longitudinal retaining wall (9) connected perpendicularly to a free end of said first lateral retaining wall (6);
   a second longitudinal retaining wall (10) connected perpendicularly to a free end of said second lateral retaining wall (7);
   said first and second longitudinal retaining walls (9, 10) extending parallel to said longitudinal main wall (8) and forming a deflection beam opening (11) therebetween;
   said longitudinal main wall (8), first and second lateral retaining walls (6, 7) and first and second longitudinal retaining walls (9, 10) defining a transverse interlock channel (12); therebetween
   said first and second lateral retaining walls (6, 7) and said first and second longitudinal retaining walls (9, 10) having cut-out portion defining an insertion interlock recess (5) a short distance from ends of the frame members; and
   an exhibiting retaining wall (22) being connected perpendicularly to said longitudinal main wall (8) extending in a direction opposite to said first and second lateral retaining walls (6, 7);
   each of said insertion interlock connectors (3) consisting of two insertion interlock sections (24) diverging 90° apart from each other from a vertex;
   each of said insertion interlock sections (24) including,
   a transverse interlock insert (25), a resilient deflection beam (23), and an insertion interlock tab (26) all integrally connected together;
   such that said transverse interlock insert (25) can be inserted slidably into said transverse interlock channel (12) of said frame member (2) with said deflection beam (23) being disposed in said deflection beam opening (11) of said frame member (2) and said insertion interlock tab (26) overlying said transverse interlock channel (12) until said insertion interlock tab (26) becomes engaged in said insertion interlock recess (5) so as to lock said insertion interlock section (24) to said frame member (2).

2. A picture frame as claimed in claim 1, further comprising third and fourth parallel lateral retaining walls (13, 14) extending perpendicularly from opposed side edges of said respective first and second longitudinal retaining walls (9, 10) and being co-planar to said respective first and second lateral retaining walls (6, 7), and third and fourth longitudinal retaining walls (15, 16) extending perpendicularly to respective free ends of said third and fourth lateral retaining walls (13, 14), said third and fourth longitudinal retaining walls (15, 16) extending parallel to said respective first and second longitudinal retaining walls (9, 10) and forming a second deflection beam opening (17), therebetween, said first and second longitudinal retaining walls (9, 10), said third and fourth lateral retaining walls (13, 14), and third and fourth longitudinal retaining walls (15, 16) defining a second transverse interlock channel (18), said third and fourth lateral retaining walls (13, 14) and said third and fourth longitudinal retaining walls (15, 16) having cut-out portion defining a second insertion interlock recess formed the same short distance from the ends of the frame members so as to receive an insertion interlock tab of another insertion interlock connector to facilitate stacking thereof.

3. A picture frame as claimed in claim 1, wherein each of said frame members is manufactured by extrusion of aluminum.

4. A picture frame as claimed in claim 1, wherein each of said frame members is formed of a polymeric composition.

* * * * *